United States Patent
Venkatraman et al.

(10) Patent No.: US 8,971,901 B2
(45) Date of Patent: Mar. 3, 2015

(54) INTER-CELL INTERFERENCE COORDINATION IN WIRELESS NETWORKS

(75) Inventors: Shankarakrishnan Venkatraman, Irvine, CA (US); Ali Fakoorian, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 13/556,126

(22) Filed: Jul. 23, 2012

(65) Prior Publication Data

US 2013/0090120 A1 Apr. 11, 2013

Related U.S. Application Data (60) Provisional application No. 61/510,968, filed on Jul. 22, 2011.

(51) Int. Cl.
| | | |
|---|---|---|
| *H04W 40/00* | (2009.01) | |
| *H04W 16/10* | (2009.01) | |
| *H04W 28/04* | (2009.01) | |
| *H04L 5/00* | (2006.01) | |
| *H04W 72/04* | (2009.01) | |

(52) U.S. Cl.
CPC ............ *H04W 16/10* (2013.01); *H04W 28/048* (2013.01); *H04L 5/0037* (2013.01); *H04W 72/0453* (2013.01)
USPC ...................................................... 455/447

(58) Field of Classification Search
USPC ............. 455/447–448, 452.1, 452.2; 370/329
See application file for complete search history.

(56) References Cited

U.S. PATENT DOCUMENTS

| | | | |
|---|---|---|---|
| 2009/0201867 A1* | 8/2009 | Teo et al. ....................... | 370/329 |
| 2009/0221297 A1* | 9/2009 | Wengerter et al. ............ | 455/453 |
| 2010/0309866 A1* | 12/2010 | Katayama et al. ............ | 370/329 |
| 2014/0024388 A1* | 1/2014 | Earnshaw et al. .......... | 455/452.2 |

FOREIGN PATENT DOCUMENTS

EP 2211584 A2 7/2010

OTHER PUBLICATIONS

Huawei, Inter-Cell Interference Mitigation, 3GPP Draft; R1-050629, 3rd Generation Partnership Project, Mobile Competence Centre, Jun. 16, 2005.

(Continued)

*Primary Examiner* — Brandon Miller
(74) *Attorney, Agent, or Firm* — Schwegman Lundberg & Woessner, P.A.

(57) ABSTRACT

Systems and method for allocation and optimization of sub-carriers by a plurality of cells based, at least in part, on aspects of user equipment utilizing the wireless communication network. A wireless network management component classifies user equipment with at least a portion of the wireless communication network as cell edge user equipment or cell central user equipment. Based on the classification of the user equipment, the management component determines resource requirements for the cells. The resource requirements can include the designation of sub-carriers as primary sub-carriers and associated power levels based on the designation for the group of cells in the wireless network. Additionally, each cell within the wireless network can utilize the designation of sub-carriers and association of power levels in configuring communications with user equipment.

29 Claims, 6 Drawing Sheets (56) References Cited

OTHER PUBLICATIONS

Sharp, Uplink Inter-cell Interference Management for LTE, 3GPP Draft; R1-072714, 3rd Generation Partnership Project, Mobile Competence Centre, Jun. 20, 2007.

Texas Instruments, Signaling Requirements to Support Semi-Static Frequency Planning for Inter-Cell Interference Mitigation in EUTRA Downlink, 3GPP Draft; R1-060369, 3rd Generation Partnership Project, Mobile Competence Centre, Feb. 9, 2006.

* cited by examiner

INTER-CELL INTERFERENCE COORDINATION IN WIRELESS NETWORKS

CROSS-REFERENCE TO RELATED APPLICATIONS

This application claims the benefit of U.S. Provisional Patent Application No. 61/510,968, entitled "PICO CELL" and filed Jul. 22, 2011. U.S. Provisional Patent Application No. 61/510,968 is incorporated by reference herein.

BACKGROUND

Wireless networks generally include a number of user devices, often referred to as user equipments (UEs), that transmit information wirelessly with network infrastructure equipment, typically referred to as "base stations" or eNode B ("eNB") equipment. Generally, the interactions between user equipment and infrastructure equipment is defined in accordance with established, standardized air interface standards, such as second generation, third generation, fourth generation air interface standards.

Generally, infrastructure equipment configured with the appropriate hardware and software components to have larger geographic coverage area within a wireless network are typically referred to as macro cells. In a typical configuration, a wireless network service provider defines a planned distribution of macro cells within a geographic area to form the wireless network. A wireless network made primarily of macro cells (e.g., a homogeneous network) can be carefully designed prior to its implementation and can be further optimized based on the known performance characteristics of the macro cells.

In order to improve performance or capacity of a wireless network, a wireless network service provider may implement a number of macro cells, in a manner similar to a homogeneous network, along with additional infrastructure equipment having different performance and operating characteristics than the macro cells, generally referred to as a heterogeneous network. Generally, the additional infrastructure equipment typically implement the same air interfaces as macro cells (e.g., eNBs), but often are much smaller in size and have smaller geographic coverage areas. Such additional infrastructure equipment can be referred to as a small cell, pico cell or femto cell. For example, small cells may be used to provide additional wireless network coverage within buildings, in between geographic boundaries of macro cells, in geographic areas having a large number of user devices (e.g., "hotspots"), and the like. In heterogeneous network implementations, signaling protocols, such as X2, have been implemented to facilitate handover decisions between the different eNBs such macro cell to macro cell handovers, macro cell to small cell handover, and small cell to small cell handovers.

As is generally known, in accordance with certain air interface standards, such as the long term evolution ("LTE") air interface standard, infrastructure equipment (macro cells and small cells) is configured to transmit information across the entire frequency bandwidth available for transmission. Unlike other air interface standards, such air interface standards, e.g., LTE, do not typically allocate portions of the available frequency bandwidth to eNBs in a wireless network. Rather every eNB in the wireless network attempts to utilize the entire frequency bandwidth to communicate information to user equipment in the geographic region served by the eNB. As such, without any type of adjustment to the configuration of eNBs implementing LTE, an LTE-based wireless network may experience heavy interference at overlapping portions of geographic boundaries of the eNBs. Such an implementation can be referred to as full frequency reuse and can be associated with degrading communications in geographic areas experiencing heavy interference.

In view of the potential for interference among cells in a homogeneous and heterogeneous network implementing air interfaces, such as LTE, various inter-cell interference coordination (ICIC) techniques have been developed to mitigate or minimize interference. One approach to ICIC, referred to as hard frequency reuse, relates to the distribution of portions of the available frequencies among the cells in a heterogeneous network. As applied to the LTE air interface standard, for example, a hard frequency reuse approach would involve subdividing portions of the available frequency bandwidth, generally referred to as sub-carriers, into disjoint sets. The formed disjoint sets of subcarriers would be then assigned to the individual eNBs within a heterogeneous or homogeneous network in a manner that would attempt to avoid adjacent eNBs or cells being assigned to the same set of sub-carriers. While hard frequency reuse approach can significantly mitigate interference between adjacent cells, the spectrum efficiency of the wireless network would like decrease significantly.

Another approach to ICIC corresponds to the combination of aspects of full frequency reuse and hard frequency reuse and is referred to as fractional frequency reuse. In a typical fractional frequency reuse embodiment, the available frequency spectrum is divided into two parts that implement different frequency reuse approaches. A first portion of the frequency spectrum is used in all cells, akin to a full frequency reuse approach. A second portion of the frequency spectrum is divided among different adjacent cells, akin to hard frequency reuse approach. In a practical implementation, a wireless network implementing fractional frequency reuse would assign, or otherwise utilize the full frequency reuse portion of the frequency spectrum to communicate with equipment that are substantially within the coverage area of a single cell. Such devices are often referred to as center cell devices or UEs. Additionally, the wireless network would then assign, or otherwise utilize, the hard frequency reuse portion of the frequency spectrum to equipment within the borders of multiple cells. Such devices are often referred to as cell edge (CE) devices or UEs.

Yet another approach to ICIC, referred to as soft frequency reuse, relates to cells in a heterogeneous or homogeneous network transmitting across of the entire available frequency spectrum. However, in a soft frequency reuse approach, each cell may be configured with varied power transmission levels across sub-carriers. More specifically, adjacent cells may coordinate such that they do not transmit at the same power level for the same sub-carriers. Accordingly, a cell with a higher power configuration for particular sub-carriers would experience less interference from an adjacent cell with a lower power configuration for the same sub-carriers.

Many ICIC techniques, such a hard frequency reuse, fractional frequency reuse and soft frequency reuse, can be implemented in a manner that is static in nature. Such static approaches are not well suited for user equipment traffic loads that may be uneven or subject to change. For example, a heterogeneous network including multiple small cells may experience heavy traffic loads at one or more small cells, but only for a defined period of time (e.g., a small cell having a geographic area corresponding to a cafeteria). Current approaches to dynamic analysis of interference scenarios among cells are generally not efficient to analyze potential interference scenarios across an entire frequency spectrum.

DETAILED DESCRIPTION

Generally described, the present disclosure relates to communication networks and the management of configuration information for infrastructure equipment utilized in a wireless communication network. Specifically, aspects of the present disclosure relate to the allocation and optimization of sub-carriers by a plurality of cells based, at least in part, on aspects of user equipment utilizing the wireless communication network.

In an illustrative embodiment, a wireless network management component classifies user equipment with at least a portion of the wireless communication network as cell edge user equipment or cell central user equipment. Based on the classification of the user equipment, the management component determines resource requirements for sectors associated with the cells in the wireless network. The resource requirements can include the designation of sub-carriers as preferred sub-carriers and associated power levels based on the designation for the group of cells in the wireless network. Additionally, each cell within the wireless network can utilize the designation of sub-carriers and association of power levels in configuring communications with user equipment and determining which sub-carriers are utilized.

Although one or more aspects of the present disclosure will be described with regard to illustrative embodiment or examples, one skilled in the relevant art will appreciate that each aspect of the present disclosure can be implemented separately or that various combination of aspects may be combined. Specifically, aspects of the present disclosure will be described with regard to heterogeneous wireless networks implementing orthogonal frequency division multiplexed ("OFDM") based air interface standards, such as LTE. One skilled in the relevant art will appreciate that the present disclosure is not necessarily limited to the illustrated heterogeneous wireless networks and can be applicable to alternative embodiments of heterogeneous wireless networks as well as various embodiments of homogeneous wireless networks. Still further, the present disclosure is not necessarily limited to implementation of any particular air interface, such as LTE. Accordingly, no particular combination of aspects of the present disclosure should be inferred.

Figure 1:
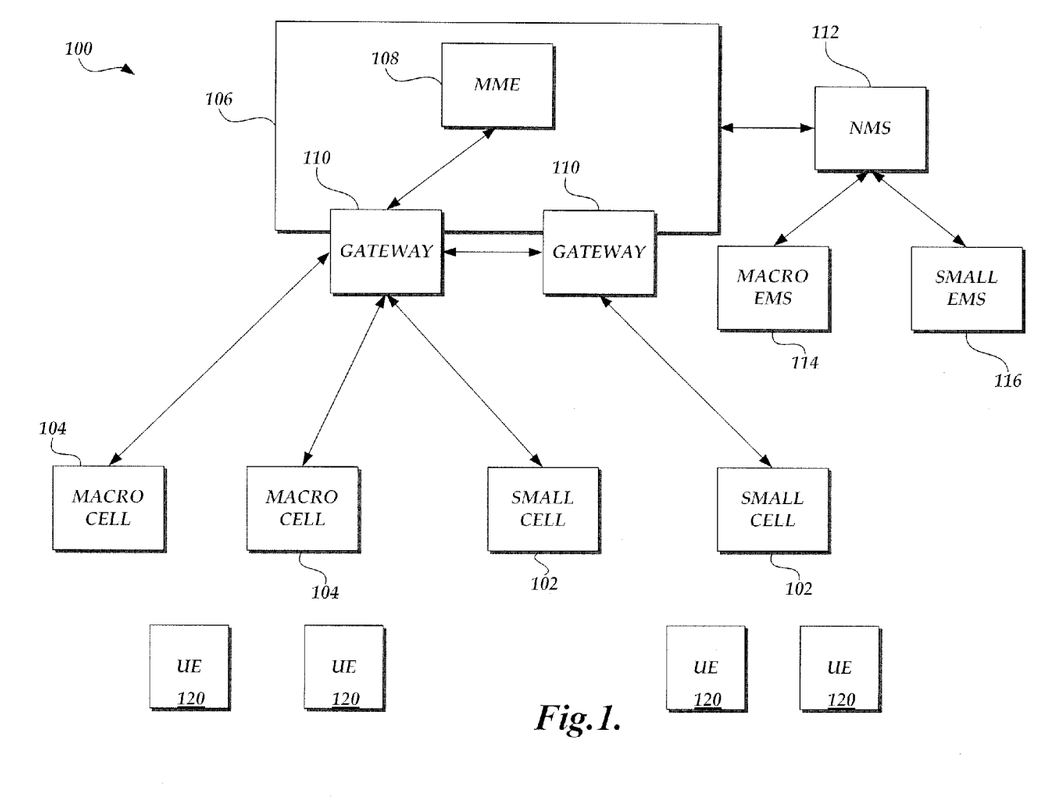
FIG 1 is a block diagram of an embodiment of a heterogeneous network including a plurality of small cells and macro cells.

FIG 1 is a block diagram of an embodiment of a heterogeneous network 100 including a plurality of small cells 102 in combination with network of macro cells 104. In accordance with traditional wireless infrastructure configurations, the small cells 102 and the macro cells 104 would be in communication with core network components, generally represented at block 106. The core network components 106 can include one or more Mobility Management Entity (MME) 108 through one or more serving gateways 110. The communication interface between the small cells 102 and the serving gateway 110 may be over a network interface, such as a Si interface. Alternatively, the communication between the small cells 102 and the serving gateway 110 can be achieved via a public network, such as via Si interface utilizing a tunneling protocol. In various embodiments, a common network management system (NMS) 112 (also referred to as network management device (NMD)) may be configured to oversee and unify the respective element management systems (EMS) for the macro network (EMS 114) and the small network (EMS 116). As will be explained in greater detail, the NMS 112 can function to implement one or more algorithms for allocating and configuring bandwidth.

In general, UEs 120 may correspond to any computing device having one or more telecommunication components capable of communicating with the small cells 102 and macro cells 104 in accordance with wireless air interface standards. The UE 120 can illustratively include mobile phones, personal data assistants (PDAs), smart phones, tablet PCs, personal computing devices, appliances, and the like. Additionally, the telecommunication components capable of communicating with the small cell 102 and macro cells 104 can be integrated directly into the UE or provided as an add-on component or supplemental component. Still further, the telecommunications components capable of communicating with the small cells 102 and macro cells 104 may be shared by two or more UEs. For example, two or more UEs may share communication components utilizing wired connections, often referred to as tethering, or via a wireless communication protocol, often referred to as a hotspot.

In general, a UE 120 may communicate with a number of macro cells 104 or small cells 102. In some instances, a UE 120 may sequentially communicate between two macro cells 104. In other instances, a UE 120 may sequentially communicate between a macro cell 104 and a small cell 102, or vice versa. In still further instances, a UE 120 may sequentially communicate between two small cells 102. Generally, a handover between, or an offload from, a first cell (e.g., a macro cell 104 or small cell 102) and a second cell in which communications between the UE and service provider correspond to the same air interface standard may be referred to as a horizontal handover or offload.

Figure 2:
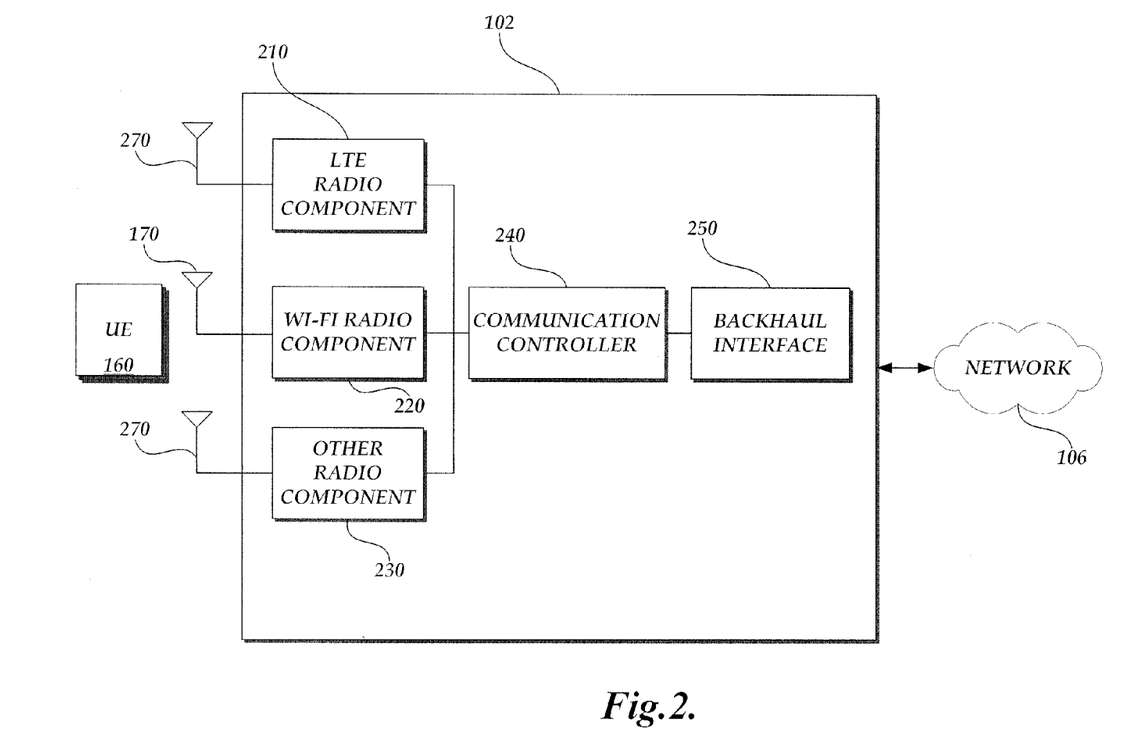
FIG 2 is a block diagram of illustrative components of an embodiment of a small cell for implementation in a heterogeneous network of FIG 1.

FIG 2 is a block diagram of illustrative components of an embodiment of a small cell 102 (FIG 1) for implementation in a heterogeneous network 100. FIG 2 illustrates an embodiment where two illustrative air interface standards, a longer range wireless air interface standard (e.g., the Long Term Evolution ("LTE") fourth generation air interface standard and a shorter ranger wireless air interface standard (e.g., the Wi-Fi air interface standard) are supported with the same device. Although FIG 2 is described with regard to a small cell 102, one skilled in the relevant art will appreciate that other cells in heterogeneous networks, such as macro cells 104, would have similar functionality or components.

Illustratively, the small cell 102 includes an integration of a set of components that facilitate transmission of data in accordance with the supported wireless air interface standards, including, but not limited to, antennas, filters, radios, base station control components, network interface components and power supplies. One skilled in the relevant art will appreciate that all such components that could be implemented in a small cell 102 are not illustrated for purposes of brevity and not limitation. Illustratively, the small cell 102 can include second components for receiving signals transmitted in accordance with one or more supported air interface standards.

As illustrated in FIG 2, one embodiment of a small cell 102 can be configured to facilitate communication in accordance with at least two air interface standards. In one embodiment, the first radio component can corresponds to an LTE radio 210 and the second radio component can corresponds to a Wi-Fi radio 220. The two radio components can be configured into a form factor that facilitates incorporation into the form factor desired for the small cell 102. In other embodiments, the radios may be configured to support other technologies, or more or less radios may be present in the small cell. As also illustrated in FIG 2, the small cell 102 can also include an additional radio component 230 for receiving signals in accordance with a third interface standard. The additional radio component 230 can be configured to receive signals in a manner redundant to either the first or second radio components 210, 220 or in a manner additional to the first and second radio components In various embodiments, the LTE radio component 110 may support frequencies from 700 MHz to 2600 MHz in frequency division duplex (FDD) and/or time division duplex (TDD) modes. In FDD embodiments, the LTE radio component 210 may provide a single RF carrier with support of up to 20 MHz FDD channels. Illustratively, the LTE air interface standard can be considered a longer range air interface standard based on the likely geographic range of communications between devices communicating in accordance with the LTE air interface standard. In some embodiments, the Wi-Fi radio component 220 may support several frequency bands simultaneously using multiple radios. For example, the Wi-Fi radio component 220 may support communications in the 2.4 GHz and 5 GHz frequency range. Illustratively, the Wi-Fi radio 220 may be configured to have up to 40 MHz channels. Illustratively, the Wi-Fi air interface standard can be considered a shorter range air interface standard based on the likely geographic range of communications between devices communicating in accordance with the Wi-Fi air interface standard. However, the characterization of air interfaces as longer range or shorter range does not necessarily imply the definition of any specific geographic ranges. Rather, any interface standard may be considered a longer range or shorter range air interface standard relative to another air interface standard.

As illustrated in FIG 2, the LTE radio component 210 and the Wi-Fi radio component 220 are connected to a base station controller 240. The communication controller 240 includes common control software and provides operation and maintenance support for all technologies supported by the small cell 102. The communication controller 240 can include the same or variations similar controllers included in other infrastructure equipment, such as macro cells. The communication controller 240 is also connected to a backhaul interface 250 in the small cell 102. In various embodiments, the small cell 102 leverages a Small Form factor Pluggable (SFP) module as the backhaul interface 250. This allows flexibility to backhaul traffic with fiber, PicoEthernet or a large variety of wireless backhaul products. As indicated in FIG 2, the small cell 102 interfaces with various user equipment (UE) 120 through antennas 270, and also with a core network 106.

In the architecture, the radio components 210, 220 in the small cell 102 communicate with the carrier's core network 180 using industry standard communication protocols. For example, the LTE radio component 110 can transmit information in accordance with the transfer control protocol ("TCP") and Internet Protocol ("IP") protocols.

Figure 3:
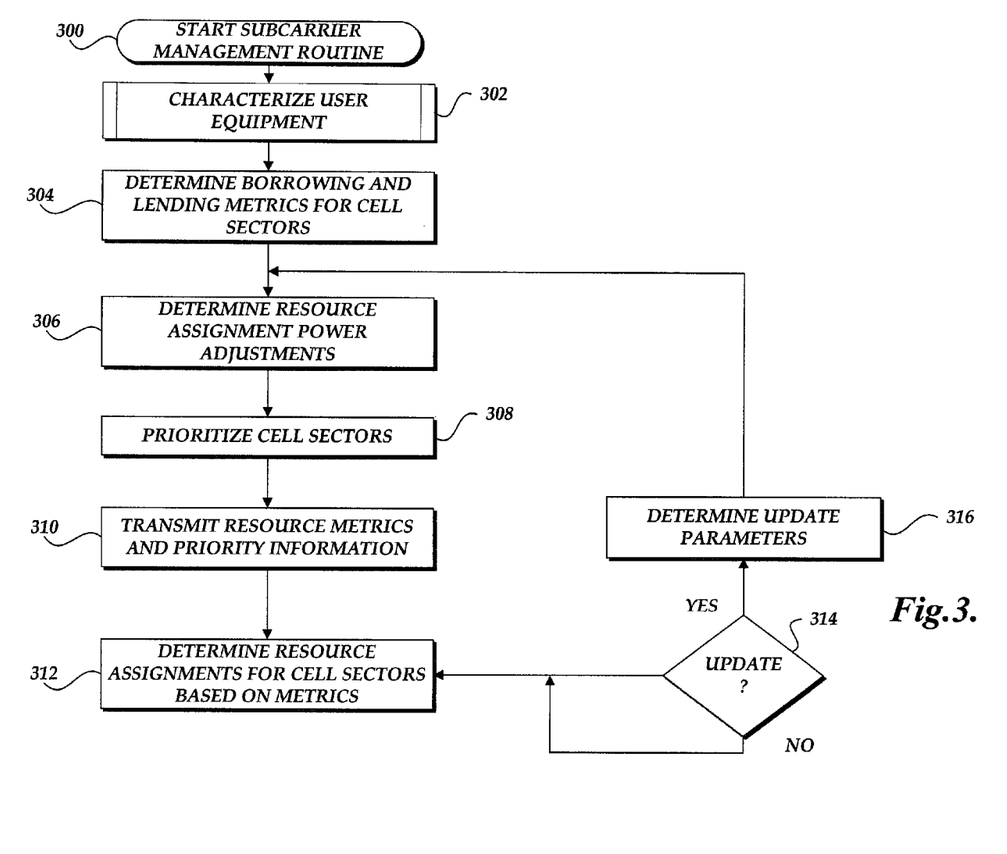
FIG 3 is a flow diagram illustrative of a subcarrier management routine implemented in a wireless network, such as heterogeneous network 100 will be described.

In FIG 3, a flow diagram illustrative of a subcarrier management routine 300, implemented in a wireless network such as heterogeneous network 100, will be described. In one aspect of routine 300, the resource assignment determines a number and set of resource blocks to be utilized for cell edge user equipment in addition to appropriate power levels for assigned resource blocks (e.g., subcarriers). Illustratively, aspects of the routine 300 may be implemented in a centralized component, such as NMS 112 (FIG 1), or similar component. Additionally, one or more aspects of routine 300 may be implemented within a cell, such as a small cell 102 or macro cell 104. Accordingly, routine 300 should not be interpreted as requiring implementation by any specific component.

With reference to FIG 3, at block 302, user equipment with the wireless network 100 is identified and characterized. Illustratively, the user equipment is characterized as either cell edge user equipment or cell central user equipment. Two illustrative sub-routines for characterizing user equipment will be described below with regard to FIGS. 4A and 4B. However, one skilled in the relevant art will appreciate that additional or alternative processes may be utilized in the characterization of user equipment.

At block 304, borrowing and lending metrics are respectively calculated for a set of cells in the wireless network 100. Illustratively, each cell is characterized as a sector. In this embodiment, the borrowing and lending metrics may be calculated on a per sector basis. These two would be the metrics that define sectors as lenders or borrowers. More precisely, a sector with more lending metric (in comparison with its neighbors) can lend to the neighbors with more borrowing metric. By way of illustrative example, the borrowing and lending metrics may be defined as follows $$B_s = \min\left(\text{round}\left(\frac{NumCEs}{NumTotalUEs} \times NumRBG\right), NumCEs \times MinRB\,GperCE\right)$$
$$L_s = NumRBG - Bs$$

where NumUES and NumCES represent total number of users and number of cell-edge users in sector S, respectively. Note that borrowing metric Bs represents number of RBGs that sector S needs to reserve or prioritize for its CE users, while lending metric Ls represents number of RBGs that can be used in low power in sector S to the favor of its neighbors. Thus each borrowing sector like S can be a lending sector for neighboring sectors,. When Bs and Ls are calculated initially, all sectors (102 and 104) have similar resource maps. As will be described in greater detail below, the initial borrowing and lending metrics may be utilized to make resource assignments for the cell sectors. In one embodiment, to capture the changes in operating conditions over time, additional or alternative criteria may be utilized to determine whether updated resource assignments should be implemented in subsequent processing of routine 300.

At block 306, borrowing and lending metrics are translated to resource and power requirements. Borrowing sectors determine achievable high and low power levels based on required number of high power resources and pre-configured values of Phigh, Plow1 and Plow2. Illustratively, each sector also determines how much each interfering sector should reduce its power on a specific subcarrier. To reach this decision, the current, or borrowing, sector firstly determines the list of neighboring interferers based on accumulating list of unique cells reported in neighbor measurement reports by cell edge UEs. A list of at most "I" reports each exceeding a minimum RSRP for neighbor "n" from each cell edge UE can be considered. The borrowing sector then calculates the average interference seen by all of its cell-edge UEs that see the neighboring sector. Additionally, the current sector also calculates the average signal reported by those CE users. The difference between these two in addition to a pre-configured delta is the amount that is told to the interfering sector to shut down on the aforementioned subcarrier.

$$P_{LOW2} \le P_{LOW1} \le P_{HIGH}$$

$$P_{S_{HIGH}} = \begin{cases} \dfrac{P_{TOTAL} - L_s \times P_{LOW2}}{B_s} & \text{if } (B_s \times P_{HIGH} + L_s \times P_{LOW2} > P_{TOTAL}) \\ P_{HIGH} & \text{else} \end{cases}$$

$$NumRBG_{LOW} = \begin{cases} L_s & \text{if } (B_s \times P_{HIGH} + L_s \times P_{LOW1} > P_{TOTAL}) \\ \dfrac{B_s \times (P_{HIGH} - 1)}{(1 - P_{LOW1})} & \text{else} \end{cases}$$

$$P_{S_{LOW}} = \dfrac{B_s \times (P_{S_{HIGH}} - 1) - NumRBG_{LOW}}{NumRBG_{LOW}}$$

$$P_{LOW,n} = \max\left(0, \dfrac{10}{N_u} \log_{10}\left(\dfrac{\sum_{u=1}^{N_u} RSRP_{u,n}}{\sum_{u=1}^{N_u} RSRP_{u,s}}\right)\right) + \Delta$$

The interfering sector uses the feedback for specific RBGs to determine the final Plow At block 308, after identifying the CE users and subcarrier demand which was described in the previous sub-sections, the EMS sorts sectors according to the descending order of cell-edge users at each sector or fraction of cell edge users at each sector. If two sectors have the same demand, the priority is given to the sector with more total number of UEs. This is done in order to favor sectors with greater fraction of cell edge users in requesting for and successfully obtaining resources. In the hybrid scheme, all eNBs need to be provided this sorted list to organize the order of RNTP changes.

At block 310, the NMS 114 transmits the ordering information and resource metrics to the set of cells. One skilled in the relevant art will appreciate that block 310 may be implemented in embodiments in which cells may be calculating resource assignments. In other embodiments in which the NMS 114, or other component, is determining resource assignments, block 310 may be omitted.

At block 312, one or more subcarriers are selected in accordance with the transmitted resource metrics and ordering information. Illustratively, for each sector, the "best" subcarriers are selected for a cell sector based on a determining the lowest interference with adjacent sectors. The interference for each RBG i can be estimated by summing over interference seen by cell edge users "u" when considering interfering neighbors "n" of sector S.

$$IoC_s(i) = \sum_{n=1}^{N} \sum_{u=1}^{Nce} RSRP_{u,n} \times PwrMap_{n,i}$$

The RNTP bit map may also be used in place of PwrMap in case it the PwrMap is not available. If a subcarrier has already been designated for use by an adjacent sector (i.e., sector S has already agreed to use it in low power), or if it is already being used in high power by current sector, then current sector would not select that subcarrier. If the allocation of sectors is successful, the sector reserves those subcarriers, or RBG as the best set of available resources (RBGbest), Illustratively, two algorithms may be implemented as part of the selection of subcarriers for cell sectors. For each algorithm, the subcarriers are selected based on the ordering or prioritization criteria selected in block 310. In one algorithm, a set of subcarriers is selected for a sector that minimizes interference while also minimizing the number of subcarriers that have to be lower or zero power in adjacent sectors (e.g., shut down). Illustratively, the cell attempts to identify a subcarrier that represents the best current subcarrier with the lowest seen interference, and without extra shut downs in adjacent sectors. Additionally, one or more constraints are calculated for the target subcarrier. Specifically, one constraint corresponds to:

$$\Delta = \text{fut}ute\_IoC_s(i) - IoC_s(RBG_{best}) \le IoC\text{Gainthres}$$

where IoCGainthres is a system parameter, and futute_IoCs(i) represents the achievable IoCs over subcarrier i. If the adjacent sectors which can lend (shut down) subcarrier i, then it will do so. Define NumSDi to represent number of adjacent sectors that can shut down on RBG i. If different target subscarriers that meet the above constraint are available, the one with the minimum NumSDi is selected. If for two subcarriers, i and j which meet the above constraint, NumSDi=NumSDj, then RBG with smaller $\Delta$ is selected as the winner. Additionally, if there is no subcarrier that can meet the above constraint, RBGbest is chosen as the final winner which indeed needs no more shut downs.

In another algorithm, a set of subcarriers is selected for a sector that minimizes the lowest seen interference without consideration to the required number of shut down at the neighbors. Illustratively, the cell attempts to identify a subcarrier that represents the best current subcarrier with the lowest seen interference, and without extra shut downs in adjacent sectors. Additionally, one or more constraints are calculated for the target subcarrier. Specifically, one constraint corresponds to $$\Delta = \text{fut}ute\_IoC_s(i) - IoC_s(RBG_{best}) \le IoC\text{Gainthres}.$$

If we have different RBGs that meet the above constraint, the one with the minimum futute_IoCs(i) is selected. Again, if there is no subcarrier that can meet the above constraint, RBGbest is chosen as the final winner which indeed needs no more shut downs. Similar to the previous algorithm, after finding the final winner, denoted by i*, borrowing (shut down) request is sent to the adjacent sectors. Next list of IoCS is updated and the selected RBG(s) in the last round(s) will not be considered for the next round. The above algorithm is repeated Bs times, for choosing all the required subcarriers.

If a sector S' receives a shutdown (borrowing) request for a subcarrier i, it will consider this request if LS'>0. If this is the case, and moreover in sector S', RNTP(i)=0, i.e., ith RBG is not already reserved for cell edge user equipment in S', then S' simply reduces its power by $P_{LOW,RBG\ r}$, P over that subcarrier, and also reduces its LS' by 1 unit LS'=LS'−1). If S' had already shut down over i (in response to the borrowing request from another sector rather than S) no more action other than updating $P_{LOW, RBG\ r}$ regarding subcarrier i is required in sector S'.

$$P_{LOW,RBG\ r} = \min(P_{S_{LOW}}, P_{LGW,n})$$

Illustratively, an output of the resource assignment of block 312 is to set for each sector of a cell, such as a macro cell 104, a relatively narrowband transmit power ("RNTP") bit map and the target power map. More specifically, for each sector of a cell, RNTP and target power map correspond to a set of vectors based on the total number of subcarriers of the available bandwidth. Illustratively, the total number of subcarriers can correspond to the total number of resource block groups ("RBG"). With continued reference to an illustrative example, for each sector in a cell, array i of RNTP vector, RNTP(i), is either 0 or 1, where 1 is indicative of a higher power level while 0 is indicative of a lower power level. The set of RBGs at high power can be used for transmission to/by cell edge users for sector S. Alternatively under different scheduling strategies, these resources experiencing better signal and lower interference may also be used improve aggregate sector throughput or other objectives.

Illustratively, the input parameters utilized to determine subcarrier selection may change over time. For example, a migration of user equipment from a small cell 102 corresponding to a hotspot may be distributed to two or more macro cells 104, such as after an event. Accordingly, in one embodiment, routine 300 can include periodic updates to the resource assignments and subcarrier selections. With continued reference to FIG 3, at decision block 314, a test is conducted to determine whether the previously determined borrowing and lending metrics should be updated. In one embodiment, the determination of whether the previously determined borrowing and lending metrics can be associated with timing of reclassification of user equipment. In another embodiment, the determination of whether the previously determined borrowing and lending metrics can be associated with fixed time windows for determining updates (e.g., periodic, scheduled updates). In yet another embodiment, the determination of whether the previously determined borrowing and lending metrics can be associated with satisfaction of other set criteria such as cell sector performance information, user equipment feedback or reporting and the like. If no update is required (or the update time window has not been achieved), the routine 300 idles until the next update check or an update check is reached.

If at decision block 314, a determination of an update is determined, at block 318, one or more update parameters are calculated. In one embodiment, the update parameters can include a determination of whether the number of assigned subcarriers is sufficient. Additionally, the update parameters can include a determination of whether one or more subcarriers previously assigned (or associated) with the cell sector can be utilized by adjacent sectors. More specifically, for each cell sector, a percentage of cell edge user equipment relative to total user equipment can be determined. If the percentage of cell edge user equipment exceeds a first threshold (e.g., a max user equipment threshold), the cell sector's update parameters can be updated to reflect the need for additional subcarriers. If the percentage of cell edge user equipment does not exceed the first threshold, the calculated percentage of cell edge user equipment is compared to a second threshold (e.g., a minimum user equipment threshold). If the percentage of cell edge user equipment is above the second threshold, then the cell sector cannot release any assigned or associated subcarriers. Alternatively, if the percentage of cell edge user equipment is below the second threshold, the cell sector can release assigned or associated subcarriers to be used by adjacent sectors. These changes change previously stored borrowing and lending metrics up or down in units of subcarriers. Once the update parameters are determined, the updated parameters are utilized to repeat the characterization and processing routine previously described with regard to blocks 306-312. As previously discussed, the utilization of the updated parameters facilitates the potential allocation of different resources (e.g., subcarriers) based on feedback provided as part of the implemented of the wireless network 100.

Figure 4A:
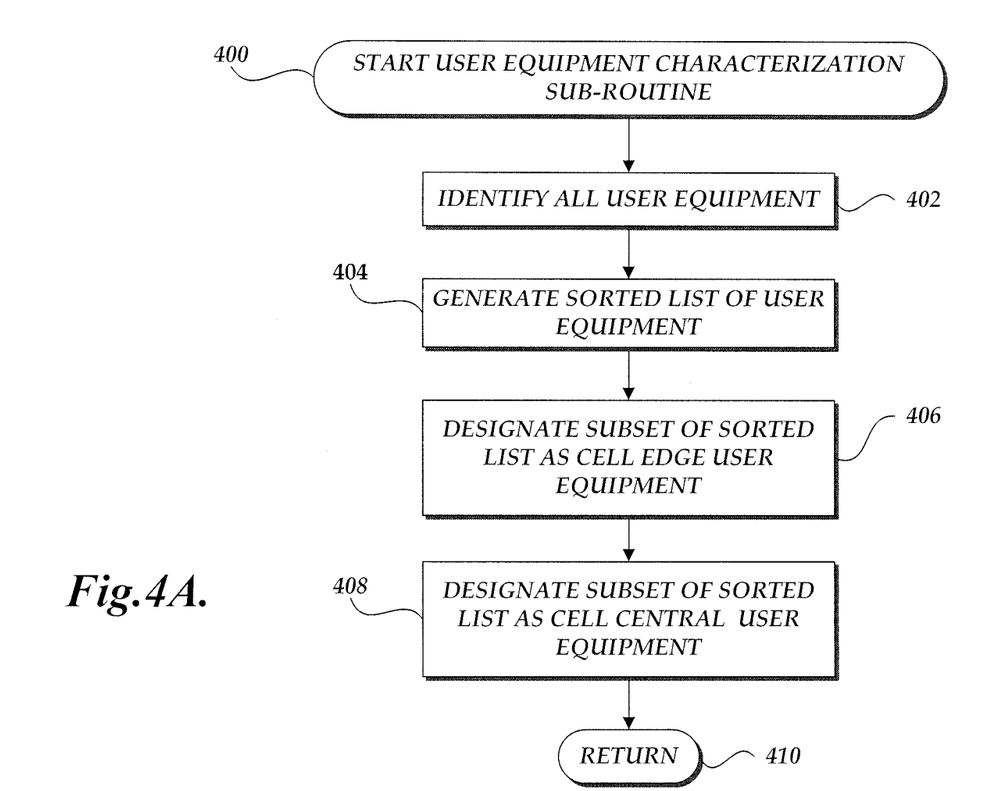
FIGS. 4A-4C are flow diagrams illustrative of sub-routines for characterizing user equipment in a wireless network.
Figure 4B:
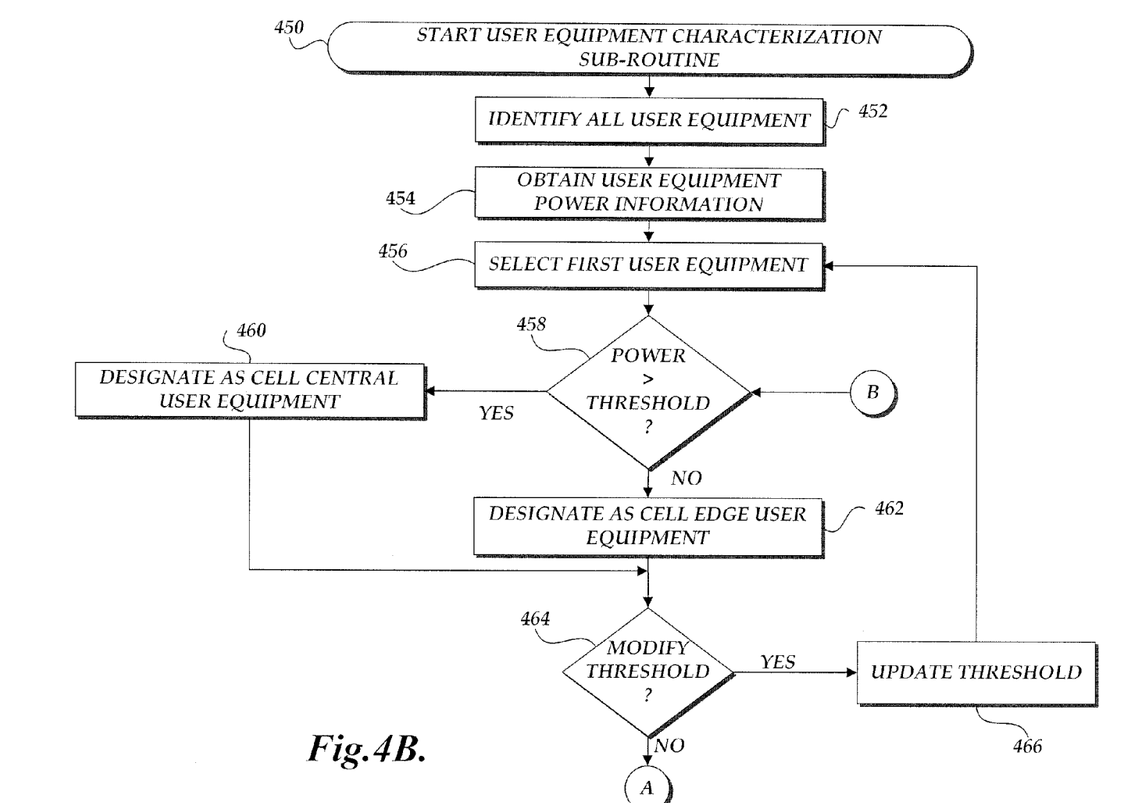
Figure 4C:
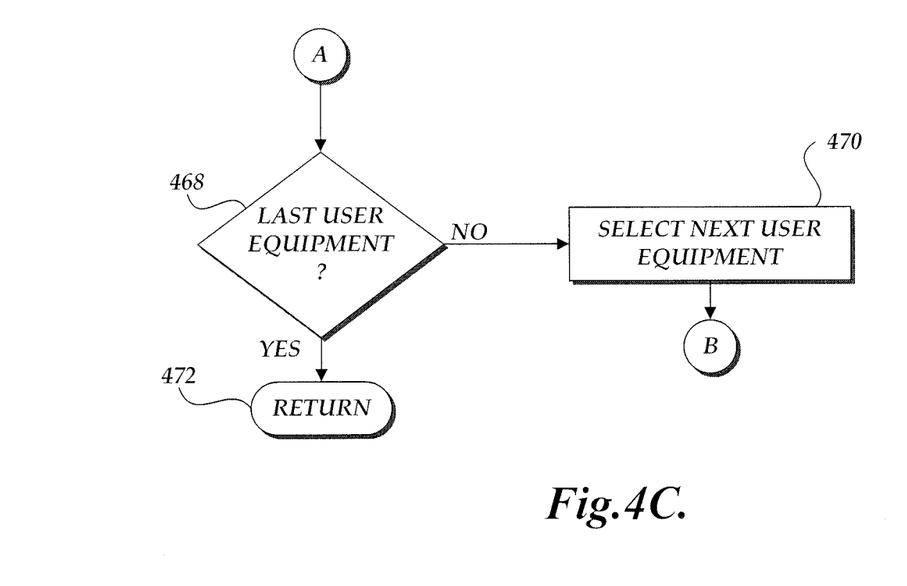

Turning now to FIGS. 4A-4C, two embodiments of a sub-routine for characterizing user equipment 120. Such a sub-routine may be utilized in accordance with block 302 (FIG 3). In one embodiment, a sub-routine 400 (FIG 4A) will be described in which user equipment is characterized based on ordering criteria. In another embodiment, a sub-routine 450 (FIG 4B) will be described in which user equipment is characterized base on threshold criteria.

With reference to FIG 4A, the sub-routine 400 begins with the identification of all user equipment 120 in a set of sectors at block 402. At block 404, the identified user equipment is sorted based on characteristics of the user equipment. For example, user equipment 120 may be sorted according to operational criteria relative to the location of the eNB components sometimes referred as geometric criteria or geometric characteristics. Illustratively, the sorting order may be such that user equipment having larger operational criteria is prioritized over user equipment having smaller operational criteria. One skilled in the relevant art will appreciate that the determination of operational criteria can be implemented in a variety of ways. For example, operational criteria can correspond to a measured signal to noise ratio ("SNR"), signal quality measurements/parameters, and the like. Additionally, other sorting may be utilized in conjunction with the operational criteria or in place of the operational criteria. More specifically, in some embodiments, routine 400 may be repeated as part of a recharacterization of user equipment 120. In such embodiments, the organizational criteria utilized to characterize the user equipment may be based on current, or substantially current, performance measurements, such as channel quality indicator ("CQI") parameters, spectral efficiency parameters, SNR parameter, and the like.

At block 406, a first subset of user equipment is characterized as cell edge user equipment based on the ordered list of user equipment. Illustratively, the selection of cell edge user equipment can be based on a percentage of the ordered list of user equipment. Additional statistical analysis may also be performed. At block 408, a second subset of user equipment is characterized as cell central user equipment based on the ordered list of user equipment. Illustratively, the remaining portion of the user equipment that has not been designated as cell edge user equipment can meet characterized as cell central user equipment. However, additional or alternative criteria may also be considered if additional or alternative characterizations are utilized. At block 408, the sub-routine 400 returns.

With reference to FIGS. 4B and 4C, the sub-routine 450 begins with the identification of all user equipment 120 in a set of sectors at block 452. At block 454, the identified user equipment power information for the identified user equipment is collected. For example, user equipment 120 may periodically transmit reference signal received power ("RSRP") or reference signal receiving quality ("RSRQ") information measured from reference signals transmitted by the eNB.

With continued reference to FIG 4B, the sub-routine 450 enters into an iterative process to process the power information for each identified user equipment 120 (block 452). At block 456, the first user equipment from the set of identified user equipment is set as a current user equipment. At decision block 458, a test is conducted to determine whether the power information for the current user equipment exceeds a threshold. If so, at block 460, the user equipment is characterized as cell central user equipment based on exceeding the threshold. Alternatively, if the power information for the current user equipment does not exceed the threshold, at block 462, the user equipment is characterized as cell edge user equipment based on exceeding the threshold.

At decision block 464, a test is conducted to determine whether the threshold should be modified. Illustratively, the threshold utilized to characterize the user equipment may be dynamic in nature. For example, in one embodiment, the threshold may be increased or decreased based on the number of user equipment characterized as cell central or cell edge user equipment. Accordingly, the threshold can be modified to generate new characterizations. If at decision block 464, the threshold should be modified, at block 466, the threshold is modified and the sub-routine 450 returns to block 456 to restart the process in accordance with the updated threshold.

As previously described with regard to FIG 4A, in some embodiments, routine 450 may be repeated as part of a recharacterization of user equipment 120. In such embodiments, the power information utilized to compare against thresholds and to characterize the user equipment may also incorporate or include performance measurement information, such as channel quality indicator ("CQI") parameters, spectral efficiency parameters, SNR parameter, and the like.

With reference to FIG 4C, alternatively at decision block 462, if the threshold is not modified, at decision block 468, a test is conducted to determine whether there are still unclassified user equipment. If so, the next identified user equipment is selected at block 470. If no additional user equipment remains, the sub-routine 450 returns at block 472.

While illustrative embodiments have been disclosed and discussed, one skilled in the relevant art will appreciate that additional or alternative embodiments may be implemented within the spirit and scope of the present disclosure. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with the scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without user input or prompting, whether these features, elements or steps are included or are to be performed in any particular embodiment. Moreover, unless specifically stated otherwise, or otherwise understood within the context as used, is generally intended to convey utilization of the conjunction "or" in enumerating a list of elements does not limit the selection of only a single element and can include the combination of two or more elements.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer-readable medium storing the computer executable components, such as a CD-ROM, DVD-ROM, or network interface. Further, the component and/or data can be included in a single device or distributed in any manner. Accordingly, general purpose computing devices may be configured to implement the processes, algorithms and methodology of the present disclosure with the processing and/or execution of the various data and/or components described above. Alternatively, some or all of the methods described herein may alternatively be embodied in specialized computer hardware. In addition, the components referred to herein may be implemented in hardware, software, firmware or a combination thereof.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method of managing wireless network components, the wireless network components include a set of cells, wherein each cell can be characterized into two or more sectors and wherein the wireless network can be characterized as a set of sectors based on the two or more sectors in the set of cells, the method comprising:
    characterizing a plurality of user equipment in the set of sectors as either cell edge user equipment or cell central user equipment;
    determining a set of power metrics for subcarriers associated with a spectrum of available bandwidth, the set of power metrics determined, at least in part, on the characterization of the plurality of user equipment;
    modifying the set of power metrics based on interference associated with adjacent sectors;
    prioritizing a set of sectors based on load at each cell and a number of cell edge user equipment attributed to each of the set of sectors; and
    for each sector in the set of sectors, dynamically assigning the subcarriers associated with the spectrum of available bandwidth based on subcarriers previously associated with adjacent sectors based on the prioritization of the set of sectors.

2. The method as recited in claim 1, wherein characterizing the user equipment is based on organizational criteria.

3. The method as recited in claim 1, wherein characterizing the user equipment is based on threshold criteria.

4. The method as recited in claim 1, wherein the set of power metrics corresponds to a number of subcarriers associated with the spectrum of available bandwidth set at a lower power level.

5. The method as recited in claim 1, wherein the set of power metrics corresponds to a number of subcarriers associated with the spectrum of available bandwidth set at a higher power level.

6. The method as recited in claim 1, wherein determining a set of power metrics for subcarriers associated with a spectrum of available bandwidth includes generating a vector corresponding to power levels for one or more subcarriers associated with the spectrum of available bandwidth.

7. The method as recited in claim 1, wherein modifying the set of power metrics based on interference associated with adjacent sectors includes modifying the set of power metrics based on a difference between a determined signal and an average interference.

8. The method as recited in claim 1, wherein dynamically assigning the subcarriers associated with the spectrum of available bandwidth based on subcarriers previously associated with adjacent sectors includes dynamically assigning subcarriers associated with the spectrum of available bandwidth based on minimizing interference between adjacent sectors.

9. The method as recited in claim 8, wherein dynamically assigning the subcarriers associated with the spectrum of available bandwidth based on subcarriers previously associated with adjacent sectors further includes dynamically assigning subcarriers associated with the spectrum of available bandwidth based on minimizing a number of subcarriers that are not utilized in adjacent sectors.

10. The method as recited in claim 1 further comprising updating the dynamically assigned subcarriers based on performance.

11. The method as recited in claim 10, wherein updating the dynamically assigned subcarriers based on performance includes updating the dynamically assigned subcarriers based on comparison of a number of current cell edge users with at least one threshold.

12. The method as recited in claim 1, wherein the wireless network corresponds to a homogeneous network.

13. The method as recited in claim 10, wherein the homogeneous network corresponds to a plurality of macro cells.

14. The method as recited in claim 1, wherein the wireless network corresponds to a heterogeneous network including a plurality of macro cells and small cells.

15. The method as recited in claim 1, wherein the wireless network operates in accordance with an orthogonal frequency division multiplexing-based air interface standard.

16. A method of managing wireless network components, the wireless network components include a set of cells, wherein the wireless network can be characterized as a set of sectors, the method comprising:
   determining a set of power metrics for subcarriers associated with a spectrum of available bandwidth, the set of power metrics determined, at least in part, on a characterization of a plurality of user equipment associated with the wireless network; and
   for each sector in the set of sectors, dynamically assigning the subcarriers associated with the spectrum of available bandwidth based subcarriers adjacent with adjacent sectors and on the prioritization of the set of sectors.
   wherein an order of assignment of subcarriers for the set of sectors is based on a priority attributed to each of the set of sector, the priority corresponding to a load at each cell and a number of characterized user equipment.

17. The method as recited in claim 16 further comprising characterizing the plurality of user equipment.

18. The method as recited in claim 17, wherein characterizing the plurality of user equipment includes characterizing user equipment in the set of sectors as either cell edge user equipment or cell central user equipment.

19. The method as recited in claim 16 further comprising modifying the set of power metrics based on interference associated with adjacent sectors.

20. The method as recited in claim 19, wherein modifying the set of power metrics based on interference associated with adjacent sectors includes modifying the set of power metrics based on a difference between a determined signal and an average interference.

21. The method as recited in claim 16, wherein the set of power metrics corresponds to a number of subcarriers associated with the spectrum of available bandwidth set at a lower power level.

22. The method as recited in claim 16, wherein the set of power metrics corresponds to a number of subcarriers associated with the spectrum of available bandwidth set at a higher power level.

23. A system comprising:
   a set of cells for communication with user equipment in accordance with wireless air interface standards, wherein each cell can be characterized into two or more sectors and wherein the wireless network can be characterized as a set of sectors based on the two or more sectors in the set of cells
   a management component for assigning subcarriers associated with a spectrum of available bandwidth, the management component operable to determine a set of power metrics associated for the subcarriers associated with a spectrum of available bandwidth, wherein the set of power metrics is determined, at least in part, on a characterization of a plurality of user equipment associated with the wireless network; and
   determining a set of power metrics for subcarriers associated with a spectrum of available bandwidth
   wherein, for each sector in the set of sectors, subcarriers associated with the spectrum of available bandwidth are assigned based on the power metrics and subcarriers previously associated with adjacent sectors, the dynamic assignment further ordered on a priority attributed to each of the set of sectors, the priority corresponding to a load at each cell and a number of characterized user equipment.

24. The system as recited in claim 23, wherein the management component is further operable to characterize the plurality of user equipment.

25. The system as recited in claim 23, wherein the management component is further operable to modify the set of power metrics based on interference associated with adjacent sectors.

26. The system as recited in claim 23, wherein the set of power metrics corresponds to a number of subcarriers associated with the spectrum of available bandwidth set at a higher power level.

27. The system as recited in claim 23, wherein the set of power metrics corresponds to a number of subcarriers associated with the spectrum of available bandwidth set at a lower power level.

28. The system as recited in claim 23, wherein the dynamic assignment of the subcarriers associated with the spectrum of available bandwidth based subcarriers associated with adjacent sectors includes the dynamic assignment of subcarriers associated with the spectrum of available bandwidth based on minimizing interference between adjacent sectors.

29. The system as recited in claim 28, wherein the dynamic assignment of the subcarriers associated with the spectrum of available bandwidth based subcarriers associated with adjacent sectors further includes the dynamic assignment of based on minimizing a number of subcarriers that are not utilized in adjacent sectors.

* * * * *